US011613469B2

United States Patent
Jin et al.

(10) Patent No.: US 11,613,469 B2
(45) Date of Patent: Mar. 28, 2023

(54) LIGHT ABSORBER PREFORM SOLUTION AND METHOD FOR MAKING THE SAME

(71) Applicants: Tsinghua University, Beijing (CN); HON HAI PRECISION INDUSTRY CO., LTD., New Taipei (TW)

(72) Inventors: Yuan-Hao Jin, Beijing (CN); Qun-Qing Li, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 119 days.

(21) Appl. No.: 17/215,241

(22) Filed: Mar. 29, 2021

(65) Prior Publication Data

US 2022/0185671 A1 Jun. 16, 2022

(30) Foreign Application Priority Data

Dec. 14, 2020 (CN) .......................... 202011470897.6

(51) Int. Cl.
*C01B 32/174* (2017.01)
*C01B 32/162* (2017.01)
(Continued)

(52) U.S. Cl.
CPC ............ *C01B 32/174* (2017.08); *B82Y 30/00* (2013.01); *B82Y 40/00* (2013.01); *C01B 32/162* (2017.08); *C01B 2202/06* (2013.01)

(58) Field of Classification Search
CPC . C01B 32/174; C01B 32/162; C01B 2202/06; C01B 2202/08; C01B 2202/28; C01B 2202/34; C01B 32/158; C01B 32/159; C01B 32/16; C01B 32/164; C01B 32/166; C01B 32/168; C01B 32/17; C01B 32/172; C01B 32/176; C01B 32/178; C01B 2202/00; C01B 2202/02; C01B 2202/04; C01B 2202/10; C01B 2202/20; C01B 2202/22; C01B 2202/24; C01B 2202/26;
(Continued)

(56) References Cited

U.S. PATENT DOCUMENTS 4,384,568 A 5/1983 Palmatier
7,813,108 B2 10/2010 Liu et al.
(Continued)

FOREIGN PATENT DOCUMENTS

CN 101425381 5/2009
CN 101556088 10/2009
(Continued)

OTHER PUBLICATIONS

Sveningsson, et al., Raman spectroscopy and field-emission properties of CVD-grown carbon-nanotube films, Appl. Phys. A 2001; 73: 409-418 (Year: 2001).*

(Continued)

*Primary Examiner* — Daniel C. McCracken
(74) *Attorney, Agent, or Firm* — ScienBiziP, P.C.

(57) ABSTRACT

A light absorber preform solution includes a solvent, a plurality of carbon nanotubes entangled with each other to form a network structure, and a plurality of carbon particles in the network structure. The plurality of carbon nanotubes and the plurality of carbon particles are in the solvent.

18 Claims, 16 Drawing Sheets

(51) Int. Cl.
  *B82Y 40/00* (2011.01)
  *B82Y 30/00* (2011.01)

(58) Field of Classification Search
  CPC ............ C01B 2202/30; C01B 2202/32; C01B 2202/36; B82Y 30/00; B82Y 40/00; Y02E 10/40; C09D 5/32; C09D 1/00; C09D 5/30; D06M 11/74; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
  See application file for complete search history.

(56) References Cited

U.S. PATENT DOCUMENTS

| | | | |
|---|---|---|---|
| 8,552,380 | B1 | 10/2013 | Florin et al. |
| 8,695,586 | B2 | 4/2014 | Liu et al. |
| 8,733,339 | B2 | 5/2014 | Liu et al. |
| 2008/0157435 | A1* | 7/2008 | Zhang ............... B29C 41/12 264/298 |
| 2009/0126783 | A1 | 5/2009 | Lin et al. |
| 2010/0104808 | A1 | 4/2010 | Fan et al. |
| 2010/0227058 | A1* | 9/2010 | Zhang ............... C01B 32/162 427/249.1 |
| 2011/0232634 | A1 | 9/2011 | Pare et al. |
| 2020/0102697 | A1 | 4/2020 | Yamagishi et al. |
| 2020/0215362 | A1 | 7/2020 | Yu et al. |

FOREIGN PATENT DOCUMENTS

| | | |
|---|---|---|
| CN | 101561194 | 10/2009 |
| CN | 102099288 | 6/2011 |
| CN | 102249176 | 11/2011 |
| CN | 102419212 | 1/2013 |
| CN | 204494846 | 7/2015 |
| CN | 106568215 | 4/2017 |
| CN | 207350826 | 5/2018 |
| CN | 104412082 | 7/2018 |
| CN | 108511760 | 9/2018 |
| CN | 109664566 | 4/2019 |
| CN | 211877253 | 11/2020 |
| CN | 112011232 | 12/2020 |
| CN | 110770387 | 1/2022 |
| JP | 2002-221445 | 8/2002 |
| JP | 2006-45034 | 2/2006 |
| JP | 2010083755 | 4/2010 |
| JP | 2011-117597 | 6/2011 |
| JP | 2012-201589 | 10/2012 |
| TW | I378217 | 11/2009 |
| TW | 201016598 | 5/2010 |
| TW | 202031861 | 9/2020 |

OTHER PUBLICATIONS

Klinke, et al, Comparative study of the catalytic growth of patterned carbon nanotube films, Surface Science 2001; 492: 195-201 (Year: 2001).*

"Chinese Academy of Sciences Science Communication Series: Nano," Jiang Shan et al., p. 73, Science Popularization Press, Sep. 2013.

* cited by examiner

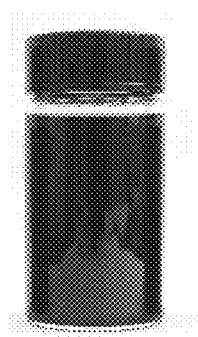 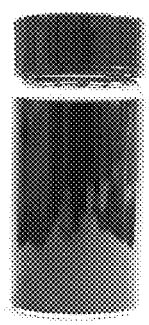 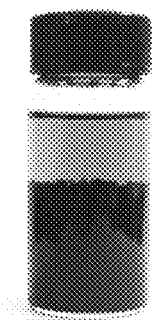
FIG. 3　　　FIG. 4　　　FIG. 5
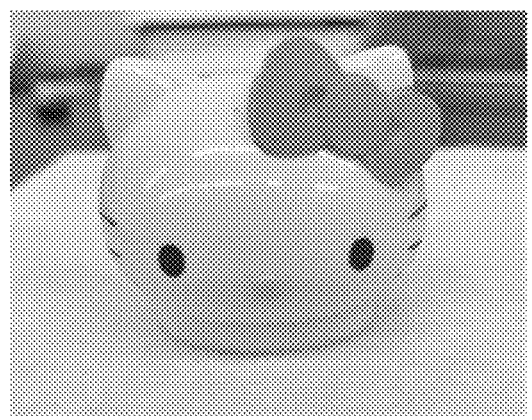
FIG. 6
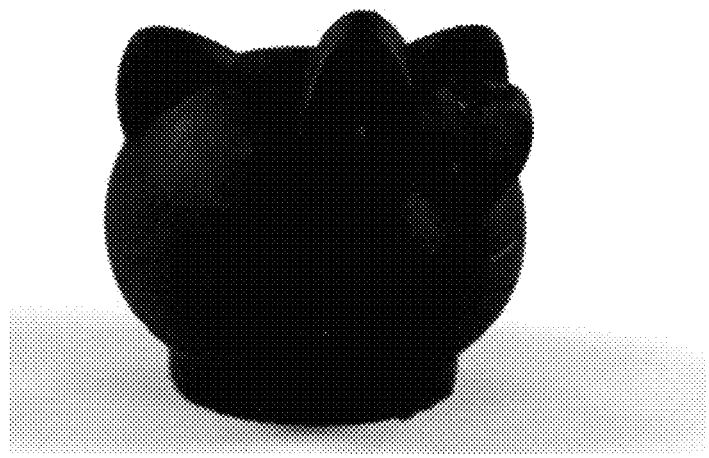
FIG. 7

400

500

LIGHT ABSORBER PREFORM SOLUTION AND METHOD FOR MAKING THE SAME

CROSS-REFERENCE TO RELATED APPLICATIONS

This application is related to commonly-assigned application entitled, "LIGHT ABSORBER AND METHOD FOR MAKING THE SAME", concurrently filed Ser. No. 17/215,231; "INFRARED DETECTOR AND INFRARED IMAGER", concurrently filed Ser. No. 17/215,219; "INFRARED STEALTH CLOTH AND INFRARED STEALTH CLOTHES", concurrently filed Ser. No. 17/215,211; and "SOLAR HEAT COLLECTOR AND SOLAR WATER HEATER", concurrently filed Ser. No. 17/215,253. The entire contents of which are incorporated herein by reference.

FIELD

The present application relates to a light absorber preform solution and a method for making the light absorber preform solution.

BACKGROUND

Infrared light is an electromagnetic wave between microwave and visible light. The heat of the sun is mainly transmitted to the earth through infrared light. Any object in the natural world is a source of infrared light, which constantly radiates infrared light to the outside. At present, infrared light is mainly used in military and medical fields, such as detecting enemy conditions and diagnosing diseases. However, the widespread. infrared light is still not fully and effectively utilized. Therefore, it is very necessary to study an absorber that can fully absorb infrared light and to facilitate the application of infrared light.

In addition, sometimes in life, sunlight also needs to be absorbed. For example, in the hot summer, people who are outdoors hope to use a sun umbrella to shield the sunlight. Therefore, it is necessary to study an absorber that can effectively absorb sunlight.

Therefore, there is room for improvement in the art.

BRIEF DESCRIPTION OF THE DRAWINGS

Implementations of the present technology will now be described, by way of embodiments, with reference to the attached figures, wherein:

FIG. 3 shows an optical photograph of 1 gram carbon black powder added into a carbon nanotube suspension in the first embodiment.

FIG. 4 shows an optical photograph of 5 grams carbon black powder added into the carbon nanotube suspension in the first embodiment.

FIG. 5 shows an optical photograph of 7 grams carbon black powder added into the carbon nanotube suspension in the first embodiment.

FIG. 6 shows an optical photograph of a toy without spraying a light absorber preform solution in a second embodiment.

FIG. 7 shows an optical photograph of the toy after spraying the light absorber preform solution in the second embodiment.

DETAILED DESCRIPTION

Figure 1:
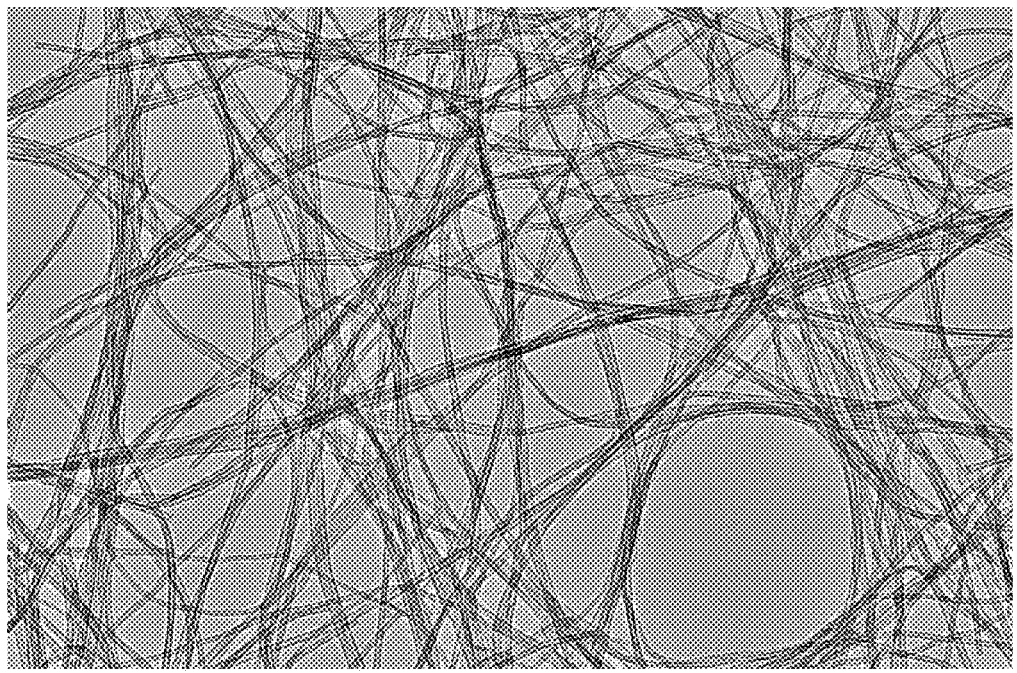
FIG. 1 shows a transmission electron microscope (TEM) image of carbon nanotubes dispersed in an ethanol solution in a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A light absorber preform solution of a first embodiment includes a solvent, a plurality of carbon nanotubes, and a plurality of carbon particles. The plurality of carbon nanotubes and the plurality of carbon particles are located in the solvent. The light absorber preform solution is a suspension solution.

The plurality of carbon nanotubes form a flocculent structure in the solvent, and the flocculent structure refers to the plurality of carbon nanotubes are attracted to and entangled with each other through van der Waals forces to form a network structure. The carbon nanotubes are not completely dispersed in the solvent, but form the network structure in the solvent. The carbon nanotubes may be single-walled carbon nanotubes, double-walled carbon nanotubes, or multi-walled carbon nanotubes. In one embodiment, the carbon nanotubes are multi-walled carbon nanotubes with an average diameter of 20 nm (nanometers).

The plurality of carbon particles is located in the network structure, and each carbon particle is inserted into the network structure and surrounded or coated by the plurality of carbon nanotubes. Each carbon particle is embedded into the network structure and trapped between the entangled carbon nanotubes. In one embodiment, some carbon particles are in direct contact with the carbon nanotubes. In one embodiment, a portion of surfaces of some carbon particles is in direct contact with the carbon nanotubes, and another portion of surfaces of some carbon particles is exposed and is spaced apart from the plurality of carbon nanotubes. In one embodiment, one portion of each of the plurality of carbon particles is in direct contact with the plurality of carbon nanotubes, and the other portion of each of the plurality of carbon particles is spaced apart from the plurality of carbon nanotubes. The type of the carbon particles is not limited, such as carbon black.

The type of the solvent is not limited, such as an organic solvent. The solvent can be a volatile organic solvent. In one embodiment, the light absorber preform solution consists of the solvent, the plurality of carbon nanotubes and the plurality of carbon particles, the carbon particles are carbon black powder, and the solvent is ethanol.

When the mass of the carbon particles is too small, the absorption performance of the light absorber formed by spraying the light absorber preform solution is poor. When the mass of the carbon particles is too much, it is difficult to spray the light absorber preform solution. The mass ratio of carbon nanotubes and carbon particles is: carbon nanotubes: carbon particles=4:5 to 4:70. The mass ratio of carbon nanotubes and carbon particles is in a range from about 4:5 to about 4:70. The mass of the solvent can be adjusted according to actual conditions to ensure that the light absorber preform solution can be sprayed. The solvent can be greater than or equal to about 50 mL (milliliter). In the light absorber preform solution, when the solvent is about 200 mL and the carbon nanotube is about 0.4 g, the mass of the carbon particles is in a range from about 0.5 g to about 7 g. In one embodiment, the solvent is 200 mL, the carbon nanotube is 0.4 g, the mass of the carbon particles is in a range from 0.5 g to 7 g. In one embodiment, the ethanol solvent is 200 mL, the carbon nanotube is 0.4 g, and the carbon particle is 5 g.

A method for making the light absorber preform solution of the first embodiment, includes one or more of the following steps:

S11, providing the plurality of carbon nanotubes;

S12, placing the plurality of carbon nanotubes into the solvent and flocculating, to obtain a carbon nanotube suspension; and S13, adding the plurality of carbon particles into the carbon nanotube suspension.

During step S11, the preparation method of carbon nanotubes is not limited, such as arc discharge method, laser evaporation method, or chemical vapor deposition method. In one embodiment, the chemical vapor deposition method is used to prepare carbon nanotubes, which includes the following steps:

S111, growing a carbon nanotube array on a growth substrate; and

S112, scraping the carbon nanotube array from the growth substrate by a knife or other similar devices, to obtain the plurality of carbon nanotubes.

During step S111, the carbon nanotube array includes the plurality of carbon nanotubes. The length of the plurality of carbon nanotubes in the carbon nanotube array is not limited. In one embodiment, the lengths of the carbon nanotubes are greater than 100 μm (micrometers). The plurality of carbon nanotubes is substantially parallel to each other and substantially perpendicular to the surface of the growth substrate. The carbon nanotube array is one of a single-wall carbon nanotube array, a double-wall carbon nanotube array, and a multi-wall carbon nanotube array. The method for making the carbon nanotube array includes the following steps:

(a) providing a substantially flat and smooth growth substrate;

(b) forming a catalyst layer on the growth substrate;

(c) annealing the growth substrate with the catalyst layer in air at a temperature in the approximate range from 700 degrees Celsius to 900 degrees Celsius for about 30 to about 90 minutes;

(d) heating the growth substrate with the catalyst layer to a temperature in the approximate range from 500 degrees Celsius to 740 degrees Celsius in a furnace with a protective gas therein; and (e) supplying a carbon source gas to the furnace for about 5 to about 30 minutes and growing a super-aligned carbon nanotube array on the growth substrate.

During step (a), the growth substrate can be a P-type silicon wafer, an N-type silicon wafer, or a silicon wafer with a film of silicon dioxide thereon. In one embodiment, a 4-inch P-type silicon wafer is used as the growth substrate.

During step (b), the catalyst layer includes catalysts, and the catalysts can be made of iron (Fe), cobalt (Co), nickel (Ni), or any alloy thereof.

During step (d), the protective gas can be made up of at least one of nitrogen ($N_2$), ammonia ($NH_3$), and a noble gas.

During step (e), the carbon source gas can be a hydrocarbon gas, such as ethylene ($C_2H_4$), methane ($CH_4$), acetylene ($C_2H_2$), ethane ($C_2H_6$), or any combination thereof. The super-aligned carbon nanotube array can have a height more than 100 microns and include the plurality of carbon nanotubes parallel to each other and approximately perpendicular to the substrate. Because the length of the carbon nanotubes is very long, portions of the carbon nanotubes are bundled together. Moreover, the super-aligned carbon nanotube array formed under the above conditions is essentially free of impurities such as carbonaceous or residual catalyst particles. The carbon nanotubes in the super-aligned array are closely packed together by the van der Waals attractive force. In one embodiment, the carbon source gas is selected from acetylene and other chemically active hydrocarbons, and the protective gas is selected from nitrogen, ammonia or inert gas.

During step S112, the carbon nanotube array is scraped from the growth substrate to obtain the carbon nanotubes, and the carbon nanotubes are, to a certain degree, able to maintain the bundled state of the carbon nanotubes.

During step S12, after adding the carbon nanotubes to the solvent, a process of flocculating is executed to get a floccule structure. The process of flocculating is selected from the group consisting of ultrasonic dispersion and high-strength agitating/vibrating. In one embodiment, ultrasonic dispersion is used to flocculate the solvent containing the carbon nanotubes for about 10 minutes to about 30 minutes. The carbon nanotubes in the solvent have a large specific surface area and the bundled carbon nanotubes have a large van der Waals attractive force, the flocculation process does not completely disperse the carbon nanotubes in the solvent, and the flocculated and bundled carbon nanotubes are attracted to each other by the van der Waals forces to form the network structure, which can also be called the floccule structure. FIG. 1 is a transmission electron microscope (TEM) image of carbon nanotubes dispersed in the ethanol. It can be seen from FIG. 1 that the carbon nanotubes of the carbon nanotube suspension are interconnected to form the network structure. In one embodiment, the carbon nanotube suspension consists of the solvent and the network structure.

Furthermore, a step of adding a dispersant into the solvent can be included in the step S12. In one embodiment, the dispersant is polyvinylpyrrolidone (PVP).

Figure 2:
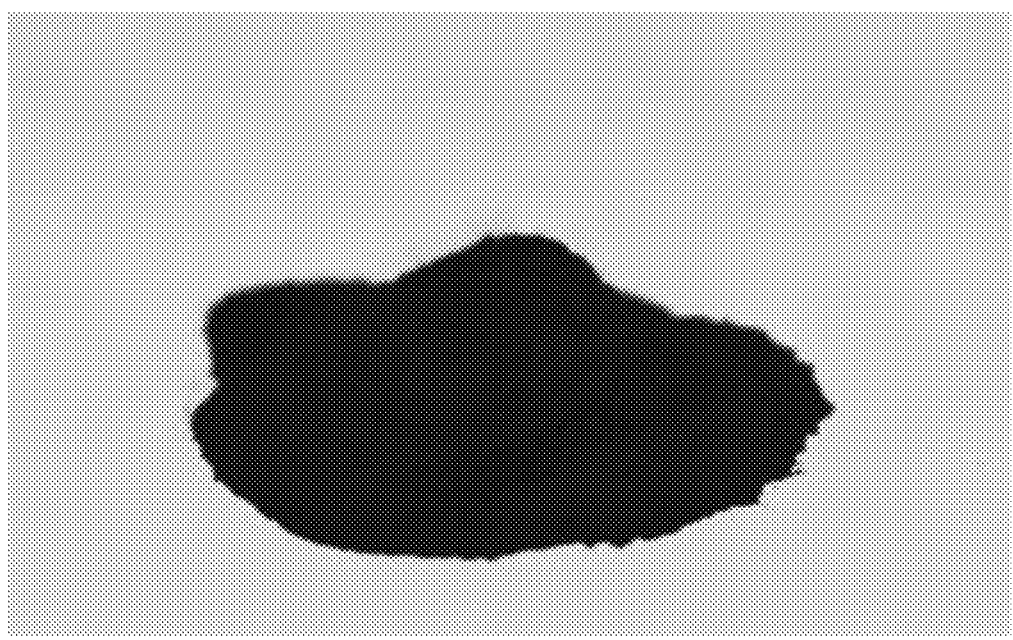
FIG. 2 shows a scanning electron microscope (SEM) image of carbon black powder with a diameter of 20 microns in the first embodiment.

During step S13, after adding the plurality of carbon particles into the carbon nanotube suspension, mixing can be executed. The mixing method is not limited. In one embodiment, the mixing is performed by ultrasonic oscillation. FIG. 2 is an optical photograph of the carbon black powder.

During step S12 and step S13, the mass ratio of carbon nanotubes and carbon particles is: carbon nanotube:carbon particles=4:5 to 4:70. The mass ratio of carbon nanotubes and carbon particles is in a range from about 4:5 to about 4:70. The mass of the solvent can be adjusted according to actual conditions to ensure that the light absorber preform solution can be sprayed. In one embodiment, the solvent is 200 mL, the carbon nanotubes are 0.4 g, and the carbon particles are in a range from 0.5 g to 7 g. The light absorber preform solution can also be prepared by mixing carbon nanotubes and carbon particles first, and then dispersing mixture of carbon nanotubes and carbon particles into the solvent.

The following is a specific example.

Example 1

The carbon nanotube array with a height of 285 microns is grown on an 8-inch silicon wafer, and the carbon nanotube array is scraped from the silicon wafer and placed in the ethanol solvent. Then, PVP is added in the ethanol solvent (0.1 g PVP per 200 mL ethanol solvent), and ultrasonic flocculation is performed using an ultrasonic cell disruptor, to form the carbon nanotube suspension. Finally, the carbon black powder with a diameter of 10 μm is added, and ultrasonic treatment is performed for 0.5 h (hour) to obtain a stable light absorber preform solution. In Example 1, when 1 g of carbon black powder is added to the carbon nanotube suspension, the aggregation effect of the carbon nanotubes and carbon black powders is not obvious, as shown in FIG. 3. When 5 g of carbon black powder is added to the carbon nanotube suspension, the carbon nanotubes and carbon black powder aggregate together, as shown in FIG. 4, but the light absorber preform solution can still be sprayed by a spray gun, and the sprayed layer remains uniform. However, when 7 g of carbon black powder is added to the carbon nanotube suspension, the carbon nanotubes and carbon black powder aggregate seriously, to form a precipitate deposited on the bottom of the container, and the precipitate is clearly layered with the upper liquid, as shown in FIG. 5. In FIG. 5, the upper liquid is transparent, which indicates that the mass of carbon nanotubes in the upper liquid is very low. The precipitate is a colloidal substance and cannot be used for spraying. Therefore, in the carbon nanotube suspension formed by 200 mL of ethanol solvent and 0.4 g of carbon nanotubes, 5 g of carbon black powder is the best ratio for spraying.

The light absorber preform solution and the method for making the light absorber preform solution have the following advantages: first, the light absorber preform solution is sprayed on other objects to form the light absorber capable of absorbing infrared light and sunlight; second, the preparation method is simple and can be mass produced.

A light absorber of a second embodiment includes the plurality of carbon nanotubes and the plurality of carbon particles, the plurality of carbon nanotubes form the network structure, and the plurality of carbon particles are located in the network structure. Some carbon particles are inserted into the network structure, and surrounded or covered by the plurality of carbon nanotubes. In one embodiment, each carbon particle is embedded into the network structure and trapped between the entangled carbon nanotubes. The carbon particles are in direct contact with the carbon nanotubes. For each carbon particle inserted into the network structure, one portion of surface of the carbon particle is in direct contact with the carbon nanotubes, and the other portion of surface of the carbon particle is exposed and is spaced apart from the plurality of carbon nanotubes. In one embodiment, one portion of each of the plurality of carbon particles is in direct contact with the plurality of carbon nanotubes, and the other portion of each of the plurality of carbon particles is spaced apart from the plurality of carbon nanotubes. The carbon nanotube network structure connects multiple carbon particles together.

Furthermore, the light absorber can also include a substrate for supporting the network structure. The substrate is used for supporting the carbon nanotubes and the carbon particles. The type, shape, or thickness of the substrate is not limited. The substrate can be quartz, polymer, metal, ceramic, cloth or the like. The surface of the substrate can be a flat surface, a curved surface, or an irregular surface. In one embodiment, the substrate is quartz.

A method for making the light absorber of the second embodiment, includes the following steps:

S21, providing the light absorber preform solution and
S22, spraying the light absorber preform solution.

During step S22, the spraying method is not limited. In one embodiment, the spray gun is used for spraying. The diameter of the spray gun is 1 mm, the carrier gas is nitrogen with a pressure of 0.3 MPa, the effective spray range is about 150 mm, and the solution consumption is 100 mL/minute. The light absorber preform solution is sprayed on the object, such as the substrate, a cloth, and so on.

Furthermore, after step S22, drying can be used to remove the solvent. The drying method is not limited, such as heating. In one embodiment, the solvent is ethanol, and the ethanol is completely dried within a few minutes after spraying, without any heat treatment.

FIG. 6 shows an optical photograph of a toy, wherein the light absorber preform solution is not sprayed on the toy. FIG. 7 is an optical photograph of the toy coated by the light absorber that is formed by spraying the light absorber preform solution on the toy. It can be seen from FIG. 7 that the light absorber preform solution can be sprayed evenly the irregular surface. In one embodiment, the light absorber preform solution is sprayed on the quartz substrate to form the light absorber.

Figure 8:
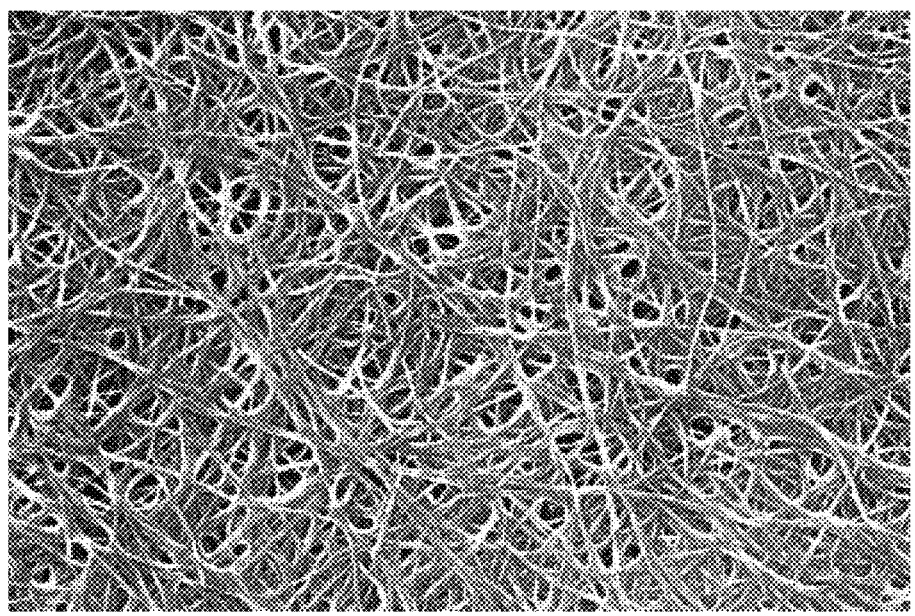
FIG. 8 shows an SEM image of a coated layer formed by spraying a pure carbon nanotube dispersion in the second embodiment.
Figure 9:
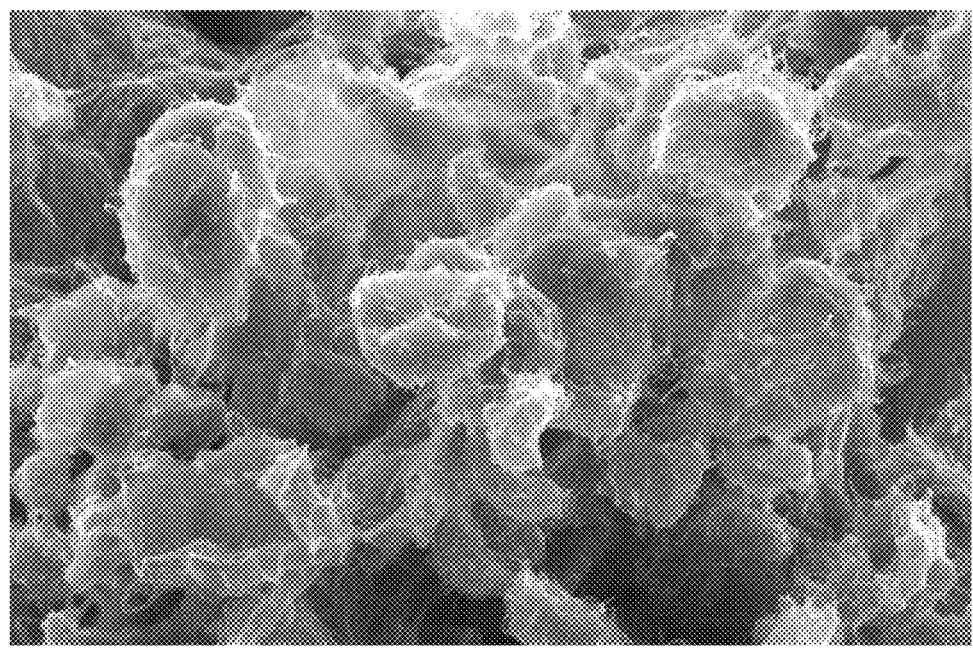
FIG. 9 shows an SEM image of a quartz substrate after spraying the light absorber preform solution in the second embodiment.

FIG. 8 to FIG. 23 show the performances of the light absorber. FIG. 8 is a scanning electron microscope (SEM) image of a coated layer formed by spraying a pure carbon nanotube dispersion, the pure carbon nanotube dispersion is formed by dispersing the pure carbon nanotubes in the solvent, and there are only carbon nanotubes in the solvent. FIG. 9 is an SEM photograph of the quartz substrate after spraying the light absorber preform solution. In FIG. 9, the light absorber consists of the quartz substrate, the carbon nanotubes and the carbon particles. It can be seen from FIG. 8 and FIG. 9 that the carbon nanotubes are effectively and uniformly attached to the carbon particles to form a sprayed layer, and this sprayed layer is the light absorber. Through the connection of the carbon nanotubes, the carbon particles are stacked with each other, some gaps are formed by the carbon particles, and some gaps are formed by the carbon nanotubes, so that the light absorber has a plurality of pores. The light absorber is a porous structure, which improves light absorption.

Figure 10:
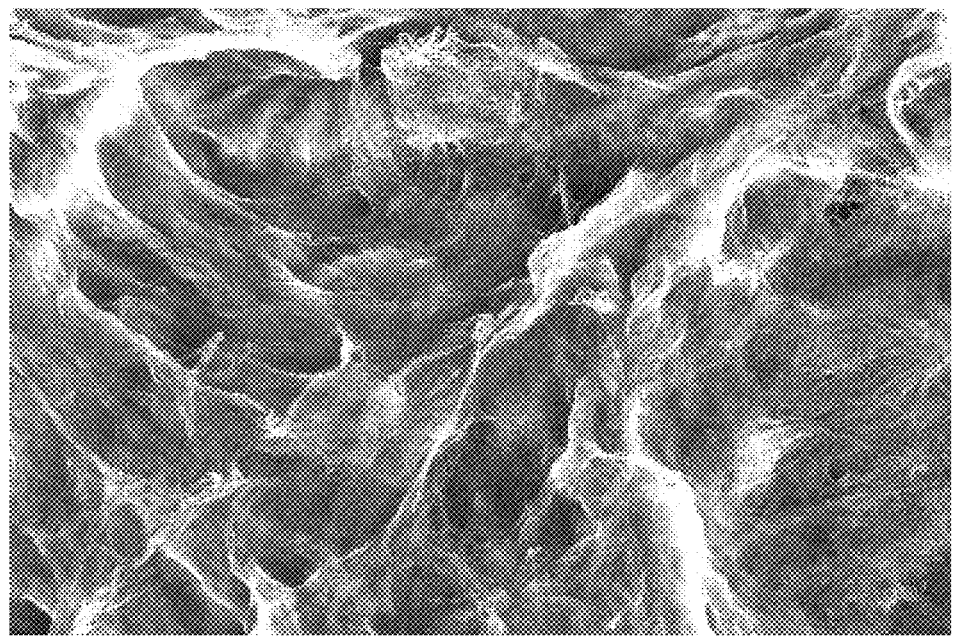
FIG. 10 shows another SEM image of the coated layer formed by spraying the pure carbon nanotube dispersion in the second embodiment.
Figure 11:
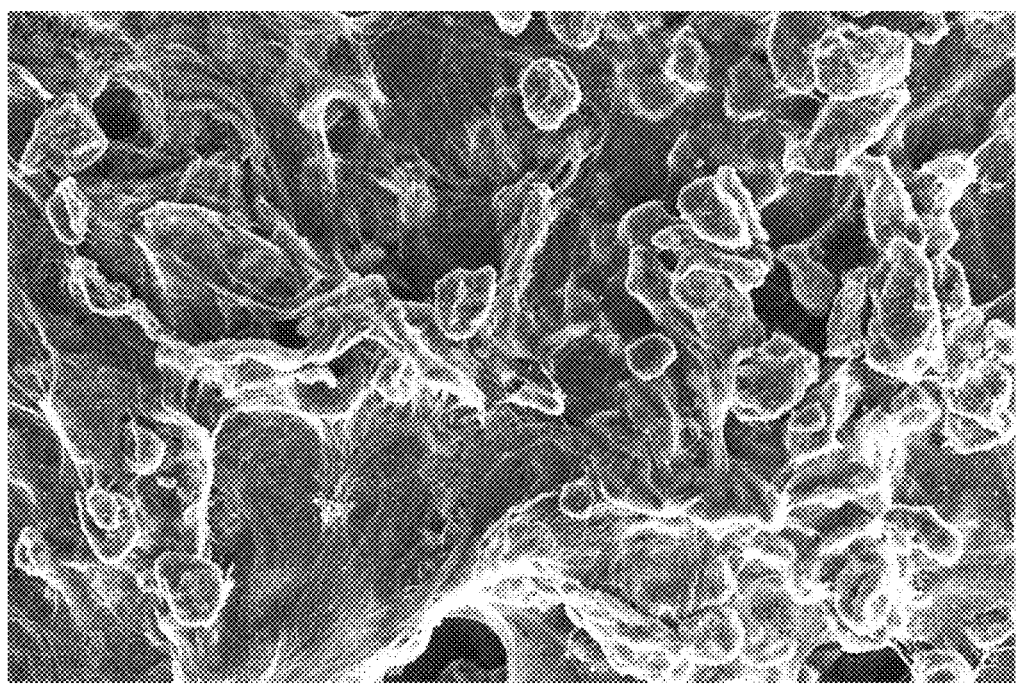
FIG. 11 shows an SEM image of a light absorber in the second embodiment.

FIG. 10 is another SEM image of the coated layer formed by spraying the pure carbon nanotube dispersion. In FIG. 10, the surface of the coated layer formed by the pure carbon nanotube dispersion is relatively flat, and the average surface roughness is tens of microns. FIG. 11 is an SEM image of the light absorber. In FIG. 11, the surface of the light absorber maintains the undulating morphology of the surface of the coated layer that is formed by spraying the pure carbon nanotube dispersion, and the carbon particles are uniformly distributed on the top surface of the coated layer.

Figure 12:
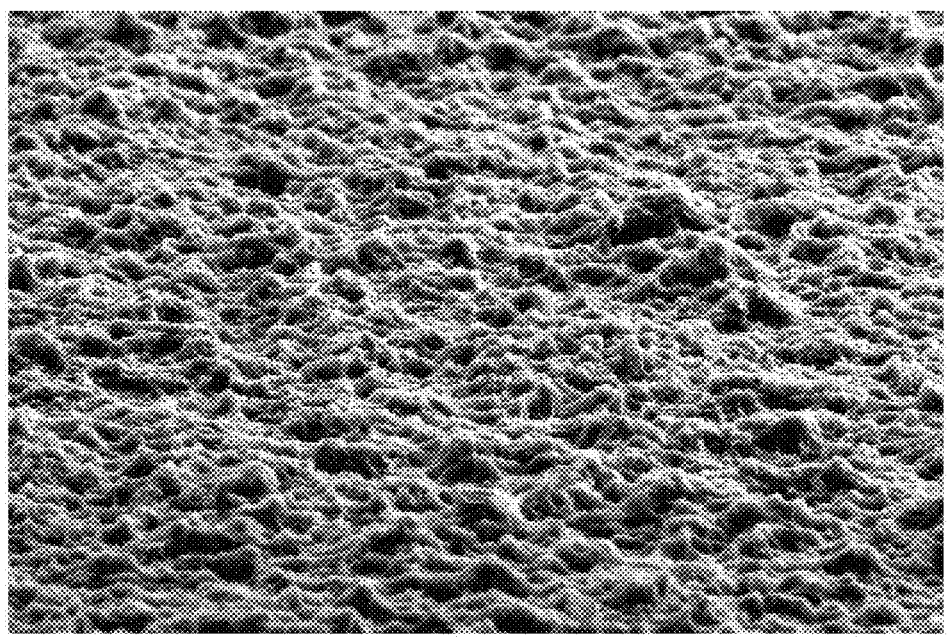
FIG. 12 shows yet another SEM image of the coated layer formed by spraying the pure carbon nanotube dispersion in the second embodiment.
Figure 13:
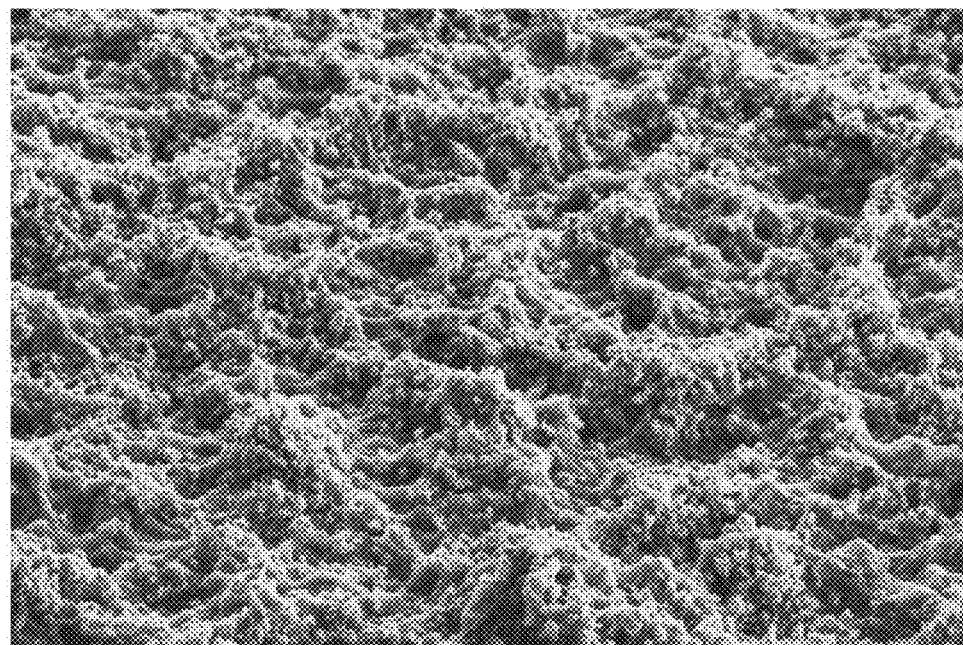
FIG. 13 shows another SEM image of the light absorber in the second embodiment.

FIG. 12 is yet another SEM image of the coated layer formed by spraying the pure carbon nanotube dispersion, and FIG. 13 is another SEM image of the light absorber. It can be seen from FIG. 12 and FIG. 13 that the surface roughness of the light absorber is greater than the surface roughness of the coated layer formed by spraying the pure carbon nanotube dispersion. It can be seen from FIG. 10 to FIG. 13 that the introduction of carbon particles increases the surface roughness of the light absorber, thereby improving the scattering and absorption of light on the surface of the light absorber.

Figure 14:
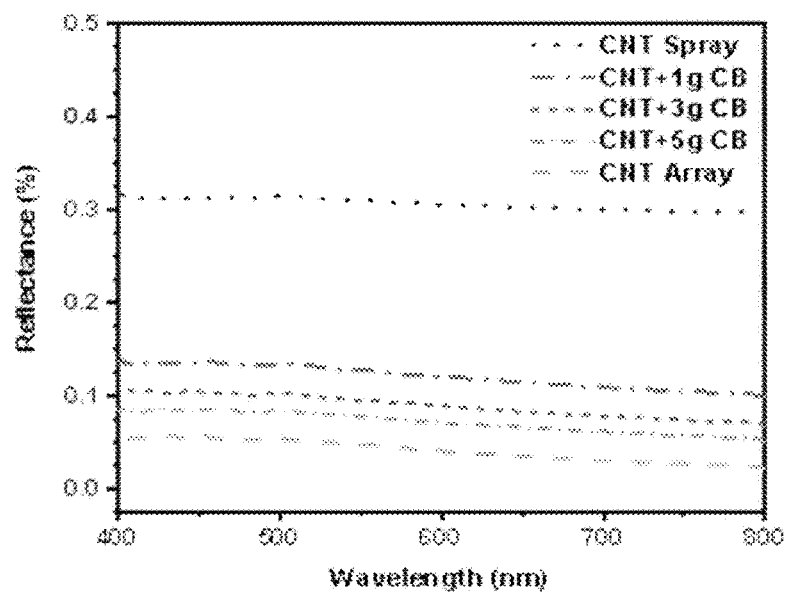
FIG. 14 shows a reflection spectrum of the light absorber in a visible light wavelength range in the second embodiment.
Figure 15:
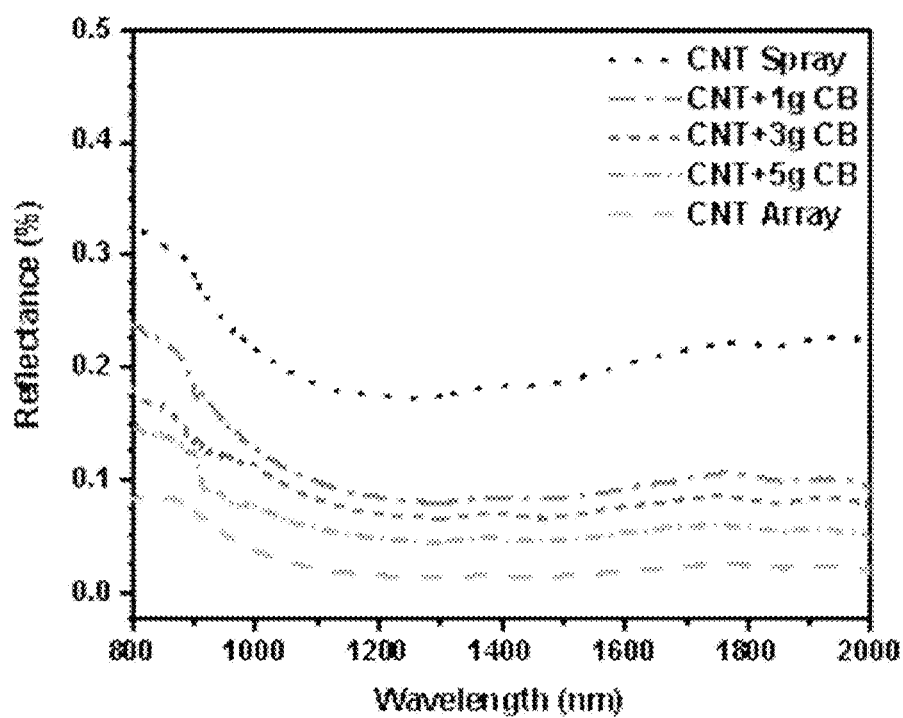
FIG. 15 shows a reflection spectrum of the light absorber in a near-infrared wavelength range in the second embodiment.
Figure 16:
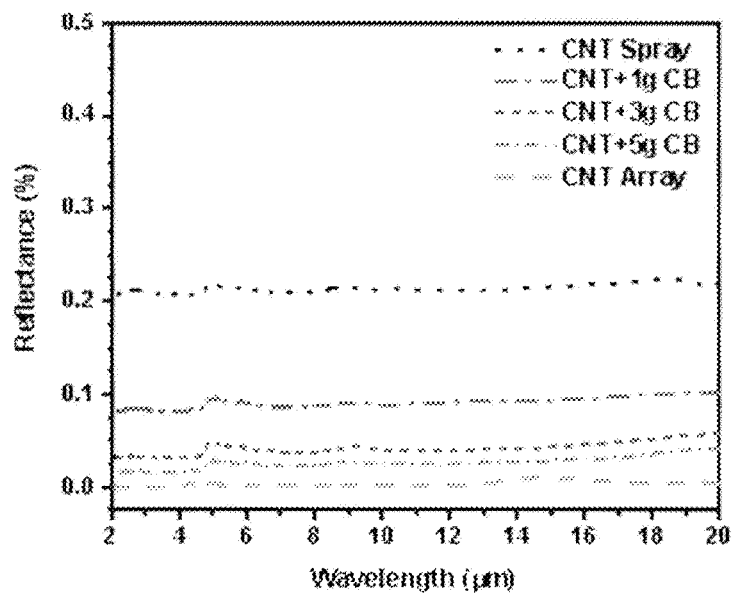
FIG. 16 shows a reflection spectrum of the light absorber in a mid-infrared wavelength range in the second embodiment.

FIG. 14 to FIG. 16 show the reflection spectrums of the light absorber under normal incidence and no polarization. FIG. 14 shows the reflection spectrum of the light absorber in a visible light wavelength range (400 nm-800 nm), FIG. 15 shows the reflection spectrum of the light absorber in a near-infrared wavelength range (800 nm-2 µm), and FIG. 16 shows the reflection spectrum of the light absorber in the mid-infrared wavelength range (2 µm-20 µm).

Seen from FIG. 14 to FIG. 16 that in the wide spectrum range from the visible light to the mid-infrared light (400 nm-20 µm), the reflectance of the light absorber decreases with the increase of mass of the carbon particle. The light absorber containing 5 g carbon particles has a reflectivity of 0.075% in the visible wavelength range, a reflectivity of 0.05% in the near-infrared wavelength range, and a reflectivity of 0.02% in the mid-infrared wavelength range. In FIG. 14-FIG. 16, the terms "CNT Spray" refers to the coated layer formed by spraying the pure carbon nanotube dispersion, and terms "CNT Array" refers to the carbon nanotube array. The reflectivity of the light absorber is lower than that of coated layer formed by spraying the pure carbon nanotube dispersion. The reflectivity of the light absorber is close to the reflectivity of the carbon nanotube array. The low reflectivity of the light absorber indicates that the light absorber has good light absorption performance.

Figure 17:
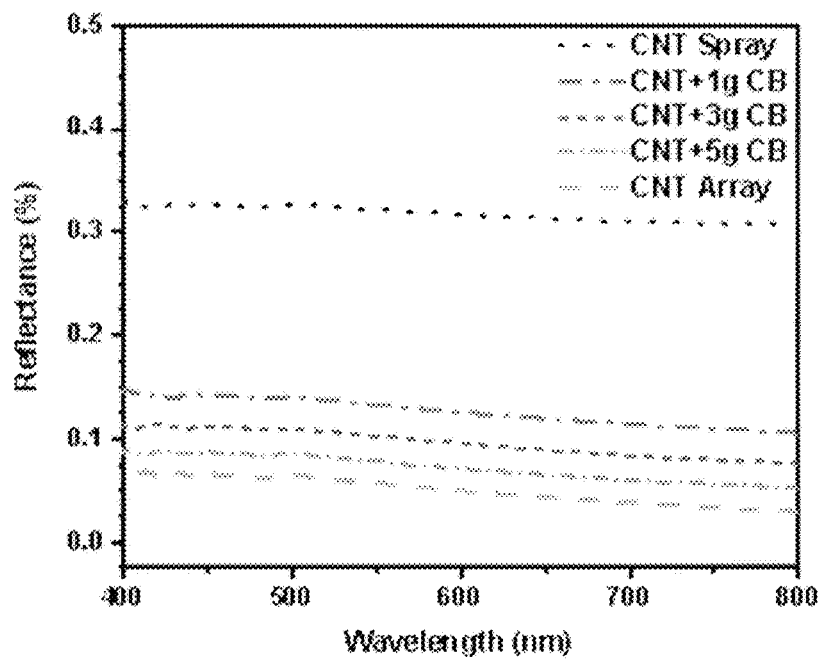
FIG. 17 shows a reflection spectrum of the light absorber when an incident angle of an incident light is 15 degrees in the second embodiment.
Figure 18:
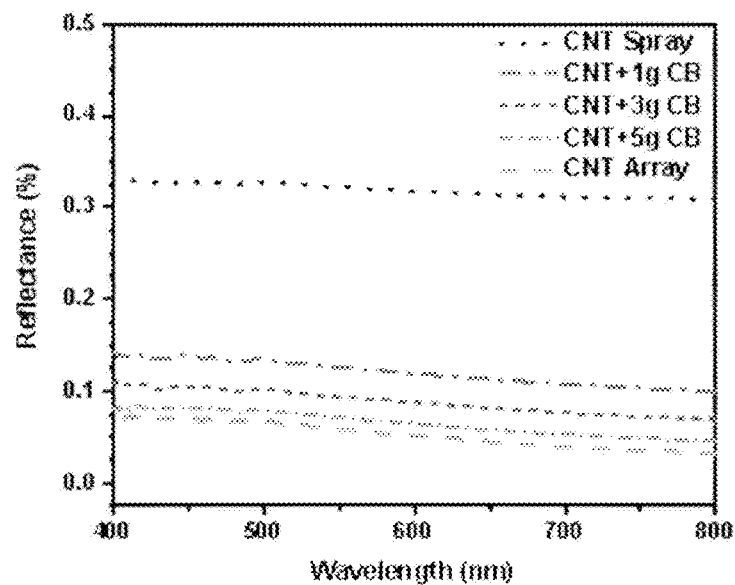
FIG. 18 shows a reflection spectrum of the light absorber when an incident angle of an incident light is 30 degrees in the second embodiment.
Figure 19:
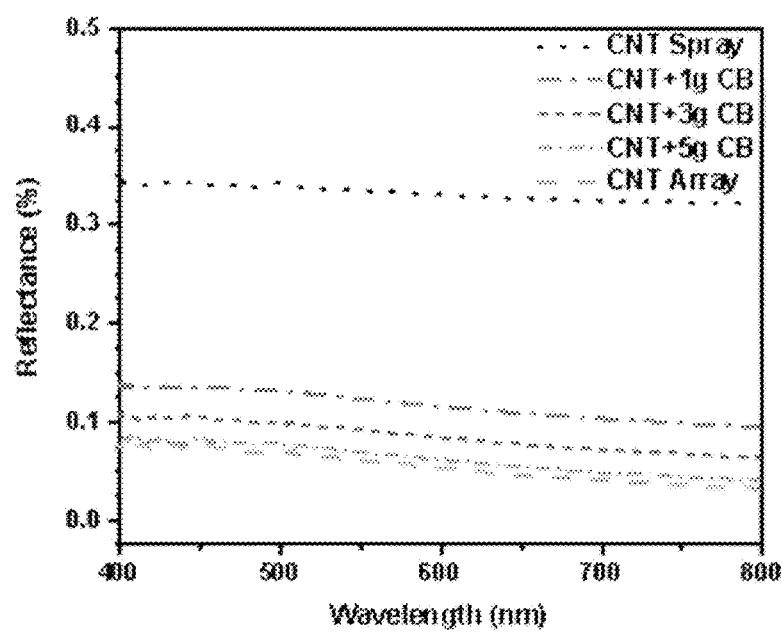
FIG. 19 shows a reflection spectrum of the light absorber when an incident angle of an incident light is 45 degrees in the second embodiment.
Figure 20:
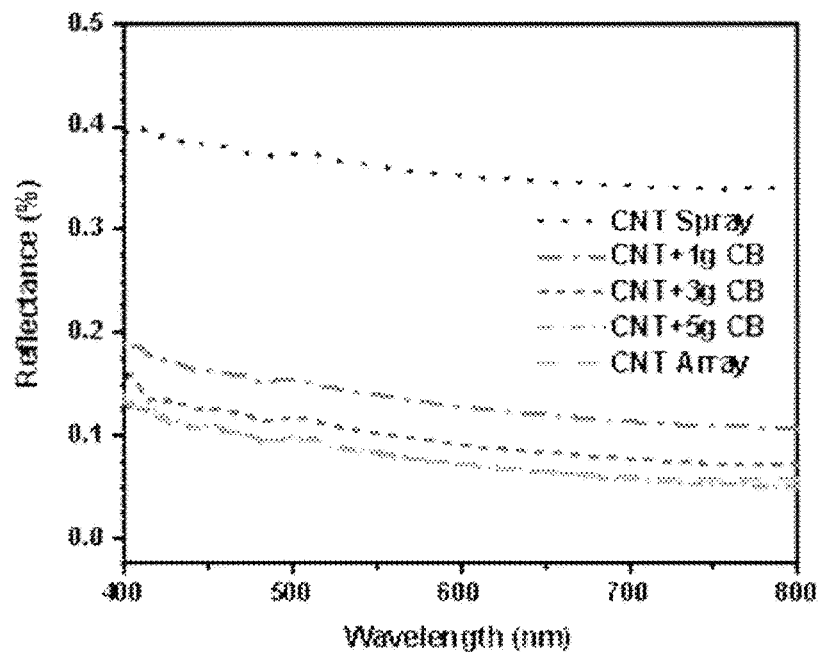
FIG. 20 shows a reflection spectrum of the light absorber when an incident angle of an incident light is 60 degrees in the second embodiment.

FIG. 17 to FIG. 20 show the reflection spectrums of the light absorber when an incident angle of an incident light is 0 degrees to 60 degrees. The incident angle refers to an angle between an incident light and a normal line, wherein the normal line is perpendicular to the surface of the light absorber. FIG. 17 shows a reflectance spectrum of the light absorber when the incident angle is 15 degrees, FIG. 18 shows a reflectance spectrum of the light absorber when the incident angle is 30 degrees, FIG. 19 shows a reflectance spectrum of the light absorber when the incident angle is 45 degrees, and FIG. 20 shows a reflectance spectrum of the light absorber when the incident angle is 60 degrees. Seen from FIG. 17 to FIG. 20 that the light absorber has approximately the same reflectivity at different incident angles, which indicates that the reflectivity of the light absorber has nothing to do with the incident angle. Thus, the light absorber has excellent omnidirectional absorption performance in the visible wavelength range. The "omnidirectional absorption" means that the light absorber has a high absorptivity at each incident angle.

In FIG. 20, the light absorber containing 5 g of carbon particles has an absorption rate of more than 99.9% at the incident angle of 60 degrees, which is almost the same as the absorption rate of the CNT array. Therefore, the light absorber achieves an omnidirectional high absorption efficiency of 99.9% in the wide wavelength range of 400 nm to 20 μm, regardless of the incident angle.

Figure 21:
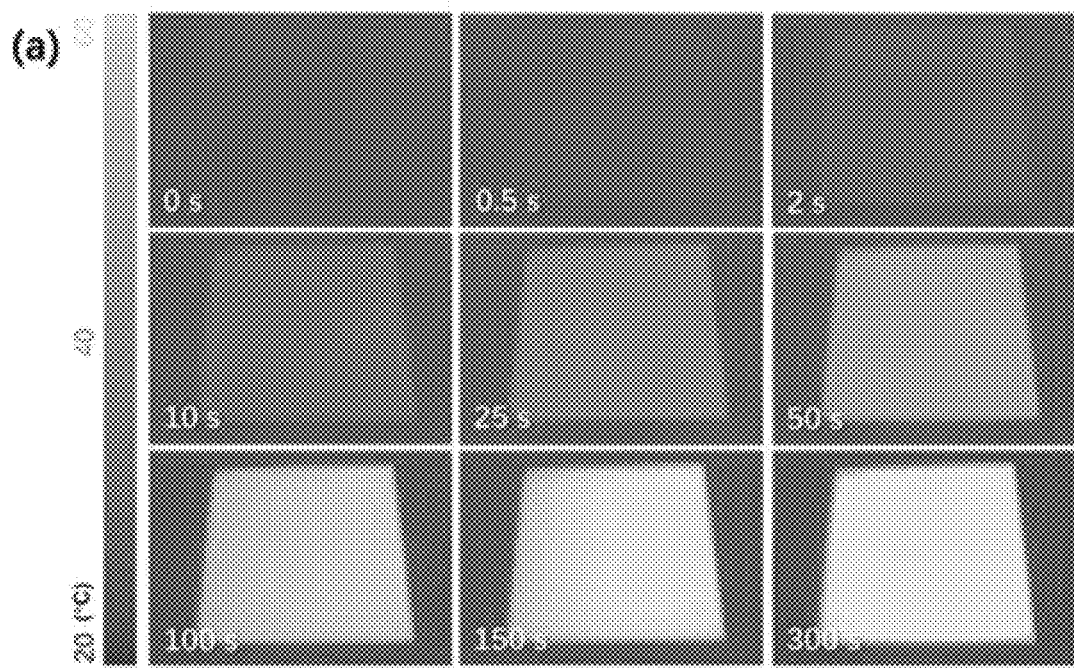
FIG. 21 shows a thermal imager photograph of the light absorber containing 5 g of carbon particles (the light absorber preform solution is sprayed on a silicon substrate) in the second embodiment.
Figure 22:
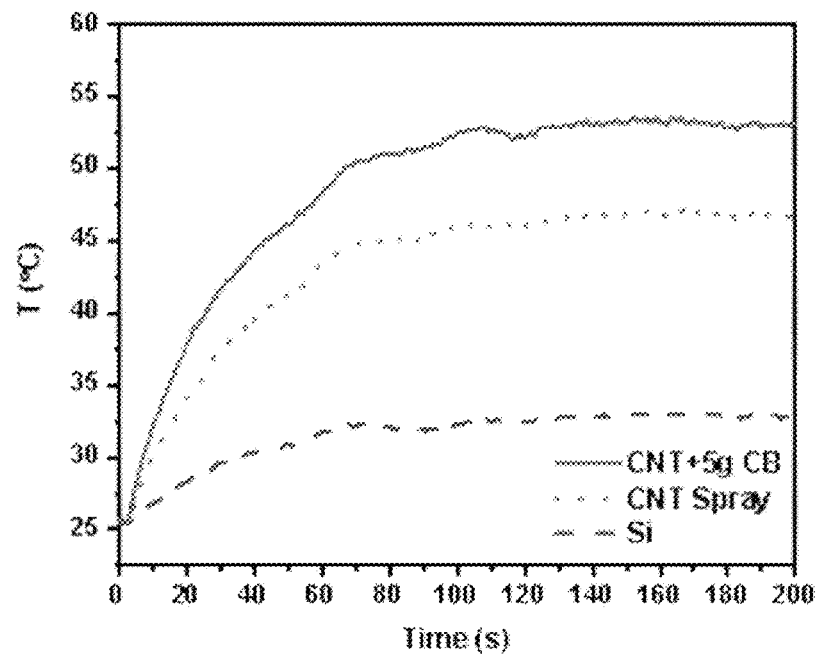
FIG. 22 shows a time-temperature of the light absorber containing 5 g of carbon particles (the light absorber preform solution is sprayed on the silicon substrate) when exposing the light absorber to sunlight in the second embodiment.

FIG. 21 shows a thermal imager photograph of the light absorber containing 5 g of carbon particles (spraying the light absorber preform solution on the silicon substrate). FIG. 22 shows a time-temperature of the light absorber containing 5 g of carbon particles (spraying the light absorber preform solution on the silicon substrate) when exposing the light absorber to sunlight, and the heating behavior of the light absorber under solar radiation is studied. The solar simulator is used as a solar radiation source, the standard power density of the solar simulator is 1000 W/m$^2$, and the temperature of the light absorber is monitored by a mid-infrared thermal imager. In FIG. 21, the sample (the light absorber containing 5 g of carbon particles) cannot be distinguished from the surrounding environment at first; after 0.5 seconds, the sample will absorb sunlight and the temperature of the sample will start to rise, at this time, the sample can be clearly distinguished from the surrounding environment; and as time increases, the temperature of the sample will increase until the temperature of the sample remains stable. FIG. 22 shows the temperature change of the sample recorded by a mid-infrared thermal imager with time, in which the coated layer formed by spraying the pure carbon nanotube dispersion and the silicon substrate with the light absorber are compared. From the point of view of the heating rate and equilibrium temperature, the light absorber containing 5 g carbon particles is the best.

Figure 23:
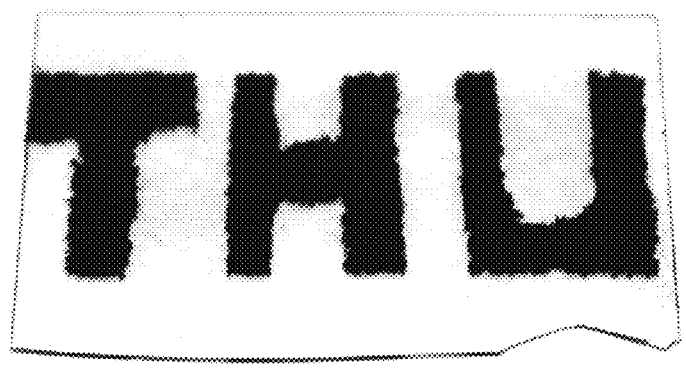
FIG. 23 shows an optical photograph of the quartz substrate after spraying the light absorber preform solution in the second embodiment.
Figure 24:
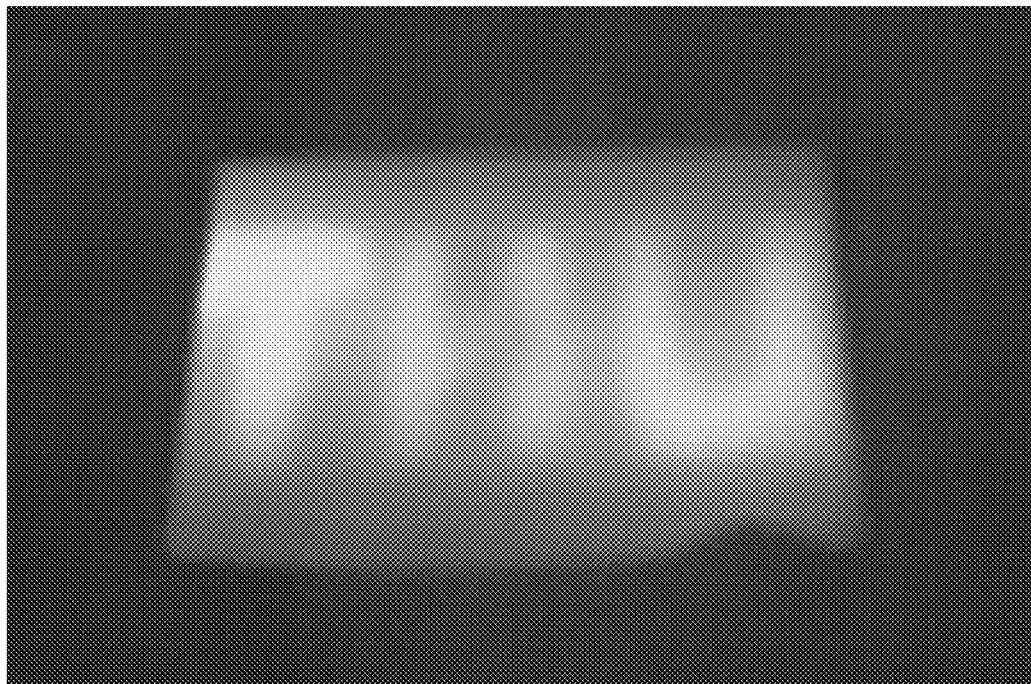
FIG. 24 shows a thermal image captured by an infrared thermal imager in the second embodiment.

FIG. 23 shows an optical photograph of the quartz substrate after spraying the light absorber preform solution on the quartz substrate. FIG. 24 shows a thermal image captured by an infrared thermal imager under the irradiation of the solar simulator. Seen from FIG. 23 and FIG. 24, the light absorber can absorb sunlight and can collect the heat of sunlight. FIG. 21 to FIG. 24 show that the light absorber has good solar heat collection performance.

Figure 25:
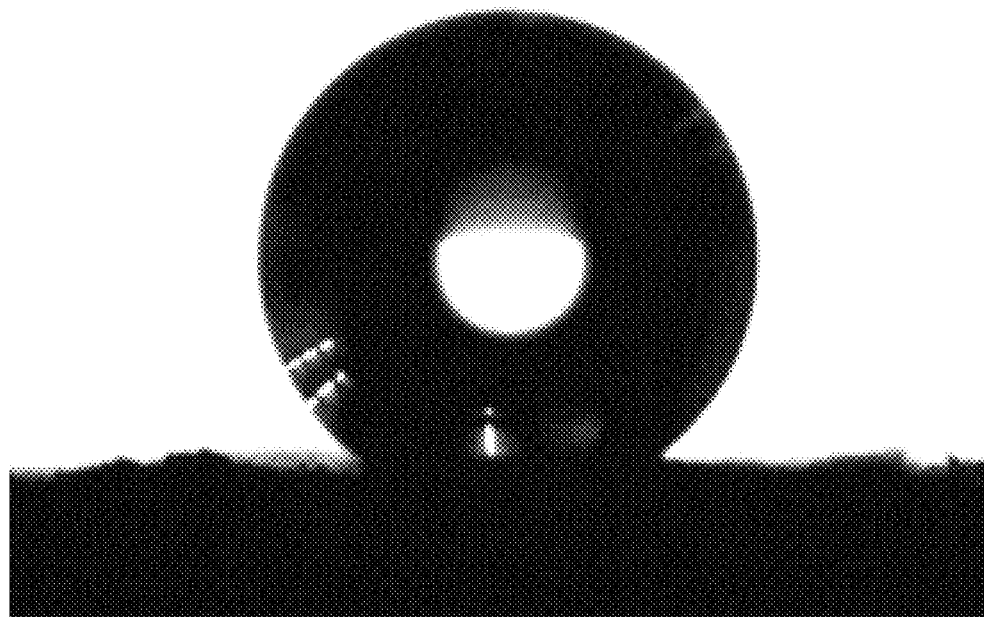
FIG. 25 shows an optical photograph of a water droplet falling on a surface of the light absorber in the second embodiment.

FIG. 25 shows an optical photograph of a water droplet falling on a surface of the light absorber. It can be seen from FIG. 25 that the contact angle between the light absorber containing 5 g of carbon particles and the water droplet reaches 165 degrees, and the water droplets are easy to roll off, indicating that the light absorber has excellent super-hydrophobic performance, the wettability can be kept stable, and the surface of the light absorber is not be damaged. When the water droplets slip off the surface of the light absorber, dust and dirt will be removed with the water droplets, indicating that light absorber has good self-cleaning performance.

The light absorber and the method for making the light absorber have the following advantages: first, the light absorber preform solution can be sprayed on curved, irregularly shaped or uneven surfaces; second, the light absorber is composed of carbon nanotubes and carbon particles, and the light absorber consists of carbon material, which can avoid the influence of other materials on the absorption of sunlight and infrared light, third, the introduction of carbon particles improves the surface roughness of the light absorber and increases the absorption rate of light; fourth, the light absorber consists of carbon material, thus the light absorber has good absorption performance in the wide wavelength range (400 nm-20 μm), and the absorption rate is 99.9%; fifth, the light absorber has excellent omnidirectional absorption performance in the wide wavelength range (400 nm-20 μm), and has nothing to do with the incident angle; sixthly, the light absorber has excellent super-hydrophobic characteristics and good self-cleaning performance.

Figure 26:
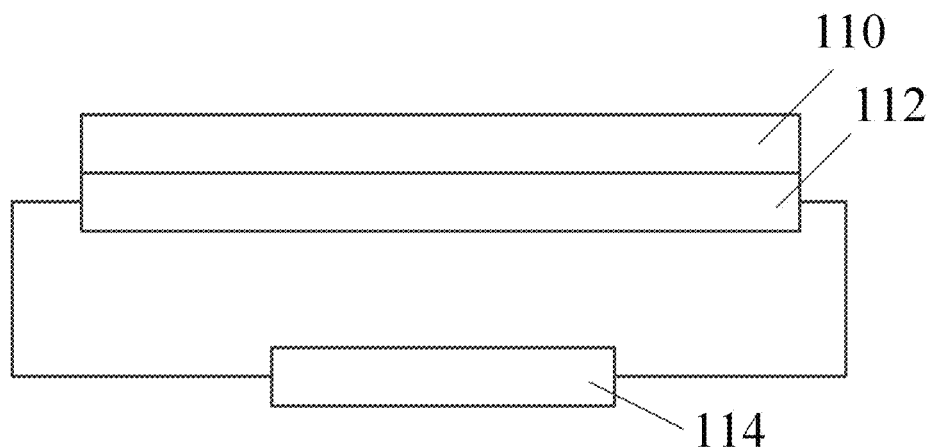
FIG. 26 shows a schematic view of an infrared detector in a third embodiment.

FIG. 26 shows an infrared detector 100 of a third embodiment. The infrared detector 100 includes an infrared light absorber 110, a thermoelectric element 112, and an electrical signal detecting element 114. The infrared light absorber 110 is located on and in direct contact with the thermoelectric element 112. The infrared light absorber 110 includes the plurality of carbon nanotubes, and length extending directions of the carbon nanotubes are parallel to the contact surface between the thermoelectric element 112 and the infrared light absorber 110. The electrical signal detecting element 114 is electrically connected to the thermoelectric element 112 by conductive wires. The electrical signal detecting element 114 and the thermoelectric element 112 are connected in series to form a loop for detecting a change of an electrical signal of the thermoelectric element 112.

The infrared light absorber 110 is formed by spraying the light absorber preform solution on the thermoelectric element 112, and the infrared light absorber 110 is the light absorber of the second embodiment above.

The infrared light absorber 110 is configured to absorb infrared light and convert the infrared light into heat. The infrared light absorber 110 has a high absorption rate for the infrared light. A temperature of the infrared light absorber 110 increases when the infrared light absorber 110 absorbs the infrared light. Since the carbon nanotubes have a high thermal conductivity, the infrared light absorber 110 can transfer the heat to the thermoelectric element 112. When the thermoelectric element 112 absorbs the heat, a temperature of the thermoelectric element 112 increases, so that the electrical performance of the thermoelectric element 112 can be changed.

The thermoelectric element 112 may be a pyroelectric element, a thermistor, or a thermocouple element. A material of the pyroelectric element has a high thermoelectric coefficient, such as lead zirconate titanate-based ceramics, lithium tantalate, lithium niobate, triglyceride sulfate, and the like. The thermistor may be a semiconductor thermistor, a metal thermistor, an alloy thermistor, or the like. In one embodiment, a material of the thermoelectric element 112 is lead zirconate titanate-based ceramic.

The electrical signal detecting element 114 is used to detect the change in the electrical signal of the thermoelectric element 112. The electrical signal detecting element 114 may be selected according to the thermoelectric element 112. In one embodiment, the thermoelectric element 112 is the pyroelectric element, the increased temperature of the thermoelectric element 112 causes a voltage or a current to appear at both ends of the pyroelectric element, and the electrical signal detecting element 114 is a current-to-voltage converter and configured to detect the change of the voltage or current of the thermoelectric element 112. In another embodiment, the thermoelectric element 112 is the thermistor, a resistance of the thermistor is changed by increasing a temperature of the thermistor; and the electrical signal detecting element 114 including a power supply and a current detector is configured to detect the change of the current, so that a change of the resistance of the electrical signal detecting element 114 can be detected. In another embodiment, the thermoelectric element 112 is the thermocouple element, the infrared light absorber 110 should be disposed at only one end or one part of the thermocouple element. Thus, a temperature difference can be generated between two ends of the thermocouple element, and the temperature difference leads to a potential difference between the two ends of the thermocouple element. The electrical signal detecting element 114 is a voltage detector and configured to detect the potential change of the thermocouple element.

When the infrared detector 100 is in operation, the infrared light irradiates the infrared light absorber 110 (the light absorber above), the carbon nanotubes convert the infrared light into the heat and transfer the heat to the thermoelectric element 112; the temperature of the thermoelectric element 112 raises after absorbing the heat, and electrical properties such as resistance, current, or voltage of the thermoelectric element 112 are changed; and the electrical signal detecting element 114 detects a change of the electrical properties of the thermoelectric element 112, so that the infrared light can be detected.

The infrared detector 100 has the following advantages: first, the infrared light absorber 110 has a good absorption performance in the near-infrared wavelength range (800 nm-2 µm) and the mid-infrared wavelength range (2 µm-20 µm), thereby improving the responsivity and sensitivity of the thermoelectric element 112, so that the infrared detector 100 has a higher sensitivity; second, the infrared light absorber 110 has an omnidirectional absorption performance that is not affected by different polarization of light, thereby expanding the application fields of the infrared detector 100.

Figure 27:
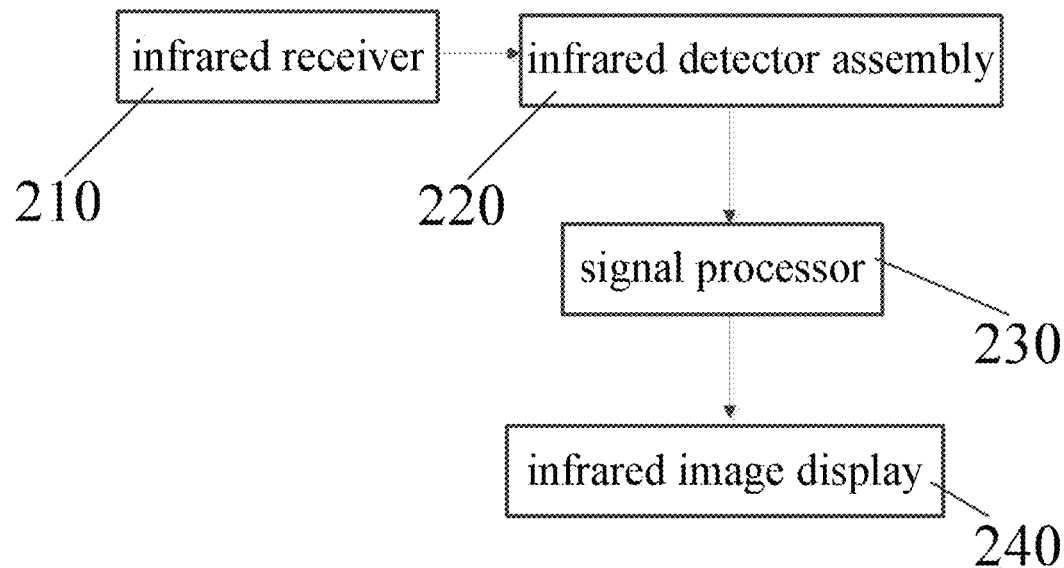
FIG. 27 shows a schematic view of an infrared imager in the third embodiment.

FIG. 27 shows an infrared imager 200 of the third embodiment. The infrared imager 200 includes an infrared receiver 210, an infrared detector assembly 220, a signal processor 230, and an infrared image display 240. The infrared receiver 210 is configured to receive infrared light and transfer the infrared light to the infrared detector assembly 220. The infrared detector assembly 220 is configured to convert the infrared light into an electrical signal and transfer the electrical signal to the signal processor 230. The signal processor 230 is configured to process the electrical signal to obtain thermal field distribution data. The infrared image display 240 is configured to display an infrared thermal image according to the thermal field distribution data.

The infrared receiver 210 is configured to receive the infrared light emitted by an object. In one embodiment, the infrared receiver 210 is the infrared lens. After the infrared light emitted by the object is received and converged by the infrared lens, the infrared light is directly transferred to the infrared detector assembly 220. It can be understood that the infrared receiver 210 can be omitted.

The infrared detector assembly 220 includes a plurality of the infrared detectors 100. The plurality of the infrared detectors 100 are arranged to form a two-dimensional array, and each of the plurality of the infrared detectors 100 can convert the infrared light into the electrical signal. The each of the infrared detector 100 is equivalent to one pixel, and the each of the infrared detector 100 converts the infrared radiation into the electrical signal. Thus, the infrared detector assembly 220 can detect the infrared light emitted by the object. A distance between any two adjacent infrared detectors 100 can be selected according to the thermal imaging resolution.

The signal processor 230 is configured to process the electrical signal of each infrared detector 100 to obtain the thermal field distribution data of the object. The signal processor 230 can calculate temperature data of each corresponding surface position of the object according to the change of the electrical signal of each infrared detector 100. The temperature data can form the thermal field distribution data of the object. Thus, the signal processor 230 can calculate the thermal field distribution data by the electrical signal of each infrared detector 100.

The infrared image display 240 is configured to display the infrared thermal image according to the thermal field distribution data. Different temperatures can be displayed in different colors in the infrared thermal image. The infrared thermal image corresponds to the temperature distribution of the object. Thus, the infrared thermal image can reflect a temperature of each position of the object. For example, when the infrared imager 200 is used in a medical field, a human body can be thermally imaged by the infrared imager 200, thus doctors can determine the disease and the extent of the disease in different parts of the body according to the thermal image, thereby providing a basis for clinical diagnosis.

When the infrared imager 200 is in operation, the infrared light emitted by the object is received by the infrared receiver 210; the infrared receiver 210 receives the infrared light and transfers the infrared light to the infrared detector assembly 220; the infrared detector assembly 220 converts the infrared light into the electrical signals and transmit the electrical signals to the signal processor 230; the signal processor 230 processes and calculates the electrical signals to obtain the thermal field distribution data; the infrared image display 240 displays the infrared thermal image of the object according to the thermal field distribution data.

The infrared imager 200 has the following advantages: first, the infrared light absorber 110 has a good absorption performance in the near-infrared wavelength range (800 nm-2 µm) and the mid-infrared wavelength range (2 µm-20 µm), thereby improving the responsivity and sensitivity of the thermoelectric element 112, so that the infrared imager 200 has a higher sensitivity; second, the infrared light absorber 110 has an omnidirectional absorption performance that is not affected by different polarization of light, thereby expanding the use range of the infrared imager 200.

Figure 28:
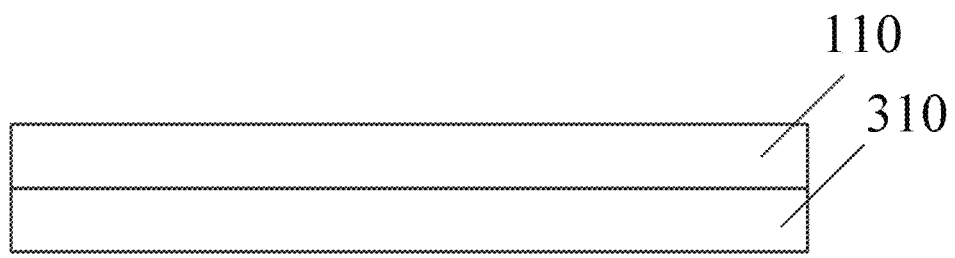
FIG. 28 shows a schematic view of an infrared stealth cloth in a fourth embodiment.

FIG. 28 shows an infrared stealth cloth 300 of a fourth embodiment. The infrared stealth cloth 300 includes a cloth substrate 310 and the infrared light absorber 110 located on the cloth substrate 310. The infrared light absorber 110 is formed by spraying the light absorber preform solution on the cloth substrate 310, and the infrared light absorber 110 is the light absorber of the second embodiment above. The infrared light absorber 110 may be located between two cloth substrates 310 to form a sandwich structure. The plurality of carbon nanotubes is parallel to a surface of the infrared light absorber 110 close to the cloth substrate 310.

The infrared light absorber 110 can be in direct contact with the cloth substrate 310. In one embodiment, the cloth substrate 310 defines a through hole or multiple through holes (not shown), and the infrared light absorber 110 is suspended on the through holes of the cloth substrate 310. A material of the cloth substrate 310 is not limited, and the material such as cotton, polyester, silk, wool, hemp, or leather may be used. In one embodiment, the infrared light absorber 110 is sewn between two cloth substrates 310.

Figure 29:
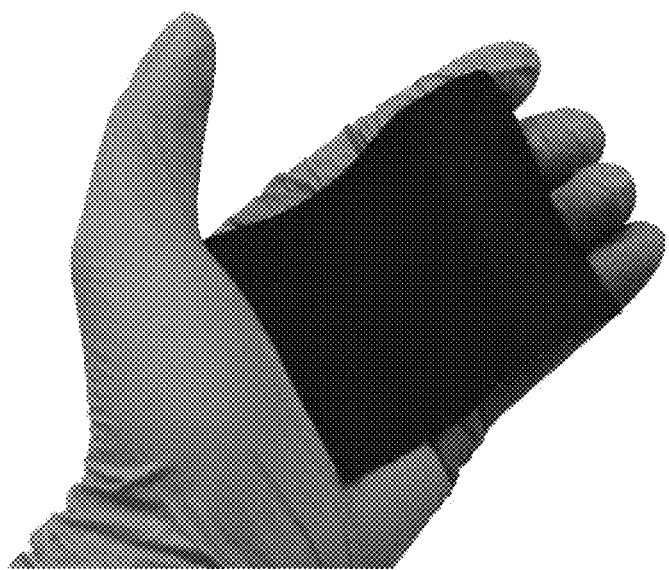
FIG. 29 shows an optical photograph of the infrared stealth cloth in the fourth embodiment.

FIG. 29 shows an optical photograph of the infrared stealth cloth 300. Seen from FIG. 29, the infrared stealth cloth 300 has good flexibility. The infrared stealth cloth 300 has a low density of $3\times10^{-6}$ g/mm$^2$, is ultra-light, and can be used in space or military fields.

Figure 30:
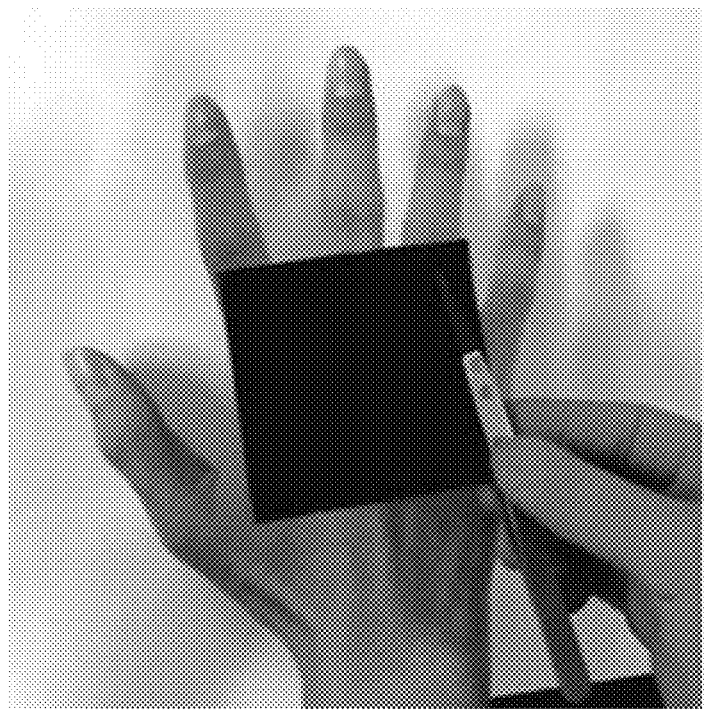
FIG. 30 shows an optical photograph of a hand covered by the infrared stealth cloth in the fourth embodiment.
Figure 31:
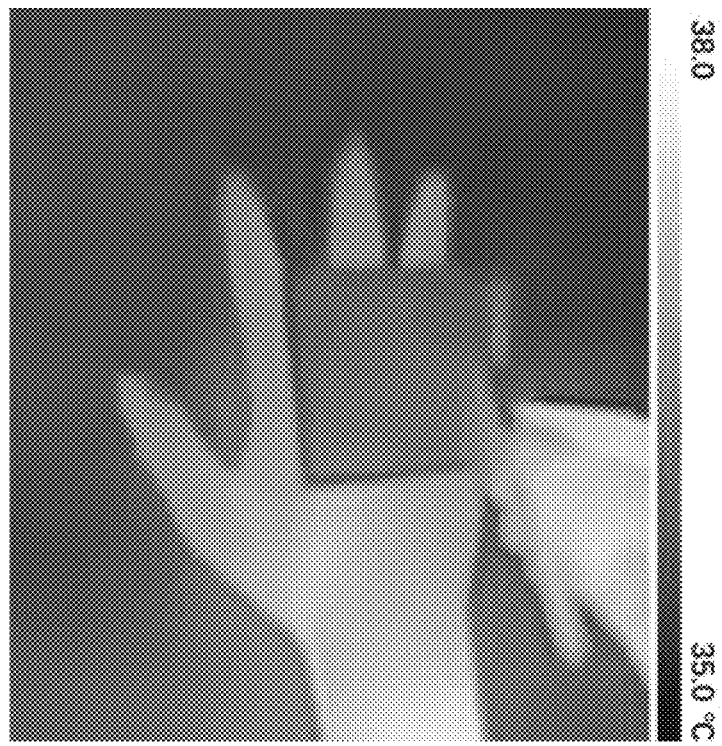
FIG. 31 shows a thermal image of the hand covered by the infrared stealth cloth in the fourth.

FIG. 30 shows an optical photograph of a hand covered by the infrared stealth cloth 300. FIG. 31 shows a thermal image of the hand covered by the infrared stealth cloth 300. Seen from FIG. 30 and FIG. 31, when the hand is covered by the infrared stealth cloth 300, infrared light emitted by the hand is absorbed by the infrared stealth cloth 300. Thus, the infrared light emitted by the hand cannot pass through the infrared stealth cloth 300 and be detected by an infrared light system. Thus, the infrared stealth cloth 300 has a good stealth effect.

Figure 32:
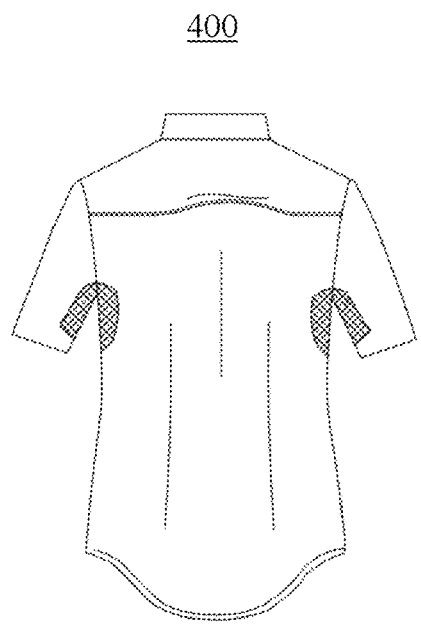
FIG. 32 shows a schematic view of an infrared stealth clothes in the fourth embodiment.

FIG. 32 shows infrared stealth clothes 400 of the fourth embodiment. At least a portion of the infrared stealth clothes 400 is made of the infrared stealth cloth 300. The whole infrared stealth clothes 400 can be made of the infrared stealth cloth 300, or a portion of the infrared stealth clothes 400 is made of the infrared stealth cloth 300. The infrared stealth clothes 400 are not limited to clothes, and the infrared stealth clothes 400 can be a glove, a mask, or the like. The clothes, glove, mask can be collectively referred to as the infrared stealth clothes 400. In another embodiment, the infrared stealth clothes 400 include a clothes body 410, and at least a portion of the clothes body 410 is made of the infrared stealth cloth 300.

The infrared stealth cloth 300 and the infrared stealth clothes 400 have the following advantages: first, the infrared light absorber 110 has a good absorption performance in the near-infrared wavelength range (800 nm-2 μm) and the mid-infrared wavelength range (2 μm-20 μm), so that the infrared stealth cloth 300 and the infrared stealth clothes 400 have a good stealth effect; second, the infrared light absorber 110 has an omnidirectional absorption performance that is not affected by different polarization of light, thereby expanding the use range and improving the stealth effect of the infrared stealth cloth 300 and the infrared stealth clothes 400.

Since the infrared light absorber 110 in the infrared stealth cloth 300 has a good ability to absorb sunlight, the infrared stealth cloth 300 can also be prepared into sunshade tools such as sun umbrellas.

Figure 33:
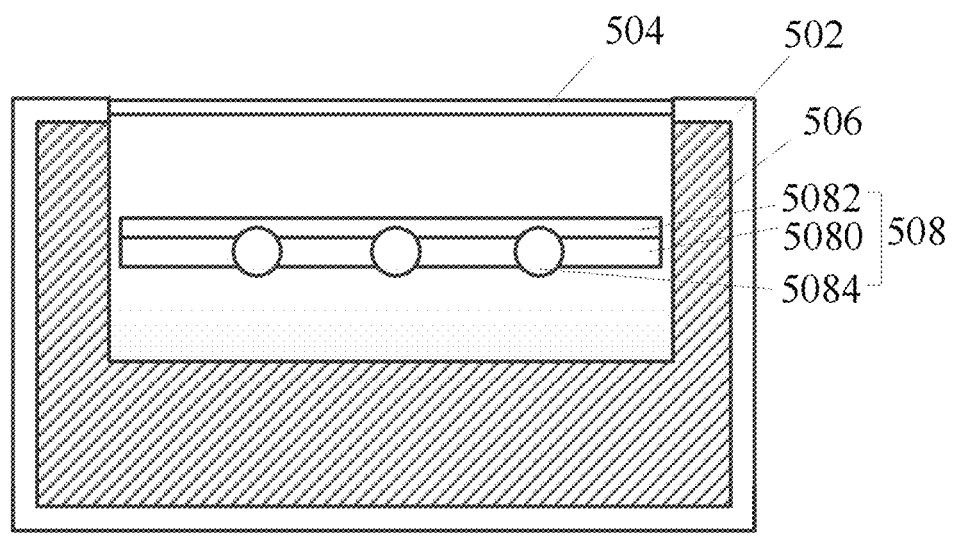
FIG. 33 shows a schematic view of a solar heat collector in a fifth embodiment.

Referring to FIG. 33, a solar heat collector 500 of a fifth embodiment includes a container 502, a transparent cover plate 504, a thermal insulation material 506 and a heat absorption plate 508. The container 502 defines an opening, and in one embodiment, the opening is located on the top of the container 502. The transparent cover plate 504 is located at the opening of the container 502, or the transparent cover plate 504 covers the opening of the container 502, so that sunlight can pass through the transparent cover plate 504 and enter inside of the container 502. The thermal insulation material 506 is located inside the container 502 and forms an insulation space. In one embodiment, the thermal insulation material 506 is located on the inner side of the container 502 so that the insulation space is located inside the container 502. The heat absorption plate 508 is located in the insulation space. In one embodiment, the heat absorption plate 508 is suspended in the insulation space. The heat absorption plate 508 includes a plurality of fluid channels 5084 to facilitate the passage of fluid. The type of the fluid is not limited, and in one embodiment, the fluid is water.

The heat absorption plate 508 includes a base 5080 and a coating 5082 located on the base 5080. The coating 5082 is the light absorber of the second embodiment above, the coating 5082 and the light absorber above have the same structure and performance. Thus, the coating 5082 includes the plurality of carbon nanotubes and the plurality of carbon particles, the plurality of carbon nanotubes form the network structure, and the plurality of carbon particles are located in the network structure. Each carbon particle inserted into the network structure is surrounded or covered by the plurality of carbon nanotubes, and the carbon particles are in direct contact with the carbon nanotubes. The carbon nanotube network structure connects multiple carbon particles together. The coating 5082 may be located on the entire surface of the base 5080, or located on the surface of the base 5080 close to the transparent cover plate 504. The coating 5082 is in direct contact with the base 5080. The coating 5082 is formed by spraying the light absorber preform solution on the base 5080. The plurality of fluid channels 5084 are defined in the base 5080. In one embodiment, the extending directions of the fluid channels 5084 are parallel to a contact surface between the base 5080 and the coating 5082.

The material of the container 502 is not limited. In one embodiment, the material of the container 502 is metal. The transparent cover plate 504 can be made of a material with high light transmittance. In one embodiment, the transparent cover plate 504 is a glass cover plate. The thermal insulation material 506 may be asbestos, foam, or the like. The material of the base 5080 is not limited, such as metal, carbon nanotube film, quartz, silicon dioxide, and so on. In one embodiment, the material of the base 5080 is metal.

The solar heat collector 500 also includes some small elements to fasten the above-mentioned elements together, and these small elements include screws, nuts and the like.

Sunlight irradiates the heat absorption plate 508 through the transparent cover plate 504. The heat absorption plate 508 absorbs the solar radiation energy, converts the solar radiation energy into heat energy, and transmits the heat energy to the fluid in the fluid channels 5084, so that the fluid is heated by the heat energy.

Figure 34:
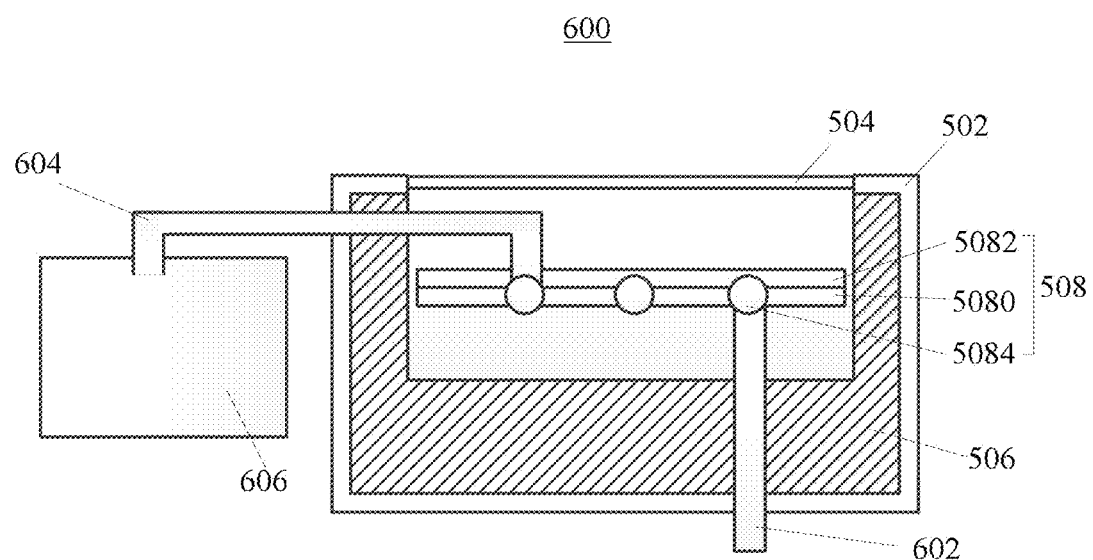
FIG. 34 shows a schematic view of a solar water heater in the fifth embodiment.

Referring to FIG. 34, a solar water heater 600 of the fifth embodiment includes the solar heat collector 500, a water inlet pipe 602, a water outlet pipe 604 and a water storage container 606. The water inlet pipe 602 is connected to one end of the fluid channel 5084, and the water outlet pipe 604 is connected to the other end of the fluid channel 5084. One end of the water outlet pipe 604 is connected to the fluid channel 5084, and the other end of the water outlet pipe 604 is connected to the water storage container 606. Fluids such as water flow into the fluid channels 5084 from the water inlet pipe 602, flow into the water outlet pipe 604 from the fluid channels 5084, and then flow into the water storage container 606 from the water outlet pipe 604. In one embodiment, the base 5080 includes the plurality of fluid channels 5084, one end of each fluid channel 5084 is connected to the water inlet pipe 602, and the other end of each fluid channel 5084 is connected to the water outlet pipe 604.

The water storage container 606 further includes an outlet (not shown the figure), the water in the water storage container 606 can flow out through the outlet of the water storage container 606.

Furthermore, a thermal insulation layer can be located on and enclosed the water outlet pipe 604 and the water storage container 606, so that the warm water or hot water flowing through the water outlet pipe 604 and the water storage container 606 is kept warm or hot. The material of the thermal insulation layer is the same as the thermal insulation material 506.

When the solar water heater 600 is in operation, sunlight is irradiated on the heat absorption plate 508 through the transparent cover plate 504, and the solar radiation energy is absorbed by the heat absorption plate 508. The heat absorption plate 508 converts the solar radiation energy into the heat energy, and transmitted the heat energy to the fluid channels 5084. In this way, the cold water in the fluid channels 5084 that is from the water inlet pipe 602 is heated by the heat energy of the fluid channels 5084, and the temperature of the water gradually rises, so that the cold water becomes warm water or hot water. Then the warm water or hot water flows into the water storage container 606 from the water outlet pipe 604, waiting for use.

The solar heat collector 500 and the solar water heater 600 have the following advantages: first, because the coating 5082 has excellent omnidirectional light absorption performance, the heat collection performances of the solar heat collector 500 and the solar water heater 600 can be improved, the heat absorption rates of the solar heat collector 500 and the solar water heater 600 are increased, and the heat loss of sunlight is reduced; Second, the coating 5082 has excellent super-hydrophobic properties and good self-cleaning performance, which prolongs the service life of the solar collector 500 and the solar water heater 600.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may comprise some indication in reference to certain steps. However, the indication used is only to be viewed for identification purposes and not as a suggestion as to an order for the steps.

What is claimed is:

1. A light absorber preform solution, comprising:
a solvent;
a plurality of carbon nanotubes entangled with each other to form a network structure, and
a plurality of carbon particles in the network structure, wherein the plurality of carbon nanotubes and the plurality of carbon particles are in the solvent, and a mass ratio of the plurality of carbon nanotubes and the plurality of carbon particles is in a range from about 4:5 to about 4:70.

2. The light absorber preform solution of claim 1, wherein the solvent is an organic solvent.

3. The light absorber preform solution of claim 2, wherein the solvent is ethanol.

4. The light absorber preform solution of claim 1, wherein the plurality of carbon particles are carbon blacks, and the solvent is ethanol.

5. The light absorber preform solution of claim 1, wherein the light absorber preform solution consists of the solvent, the plurality of carbon nanotubes, and the plurality of carbon particles.

6. The light absorber preform solution of claim 1, wherein the plurality of carbon nanotubes are multi-walled carbon nanotubes with an average diameter of 20 nm.

7. The light absorber preform solution of claim 1, wherein each carbon particle is embedded into the network structure and surrounded by the plurality of carbon nanotubes.

8. The light absorber preform solution of claim 1, wherein the solvent is greater than or equal to about 50 mL.

9. The light absorber preform solution of claim 8, wherein the solvent is about 200 mL, the carbon nanotube is about 0.4 g, the mass of the carbon particles is in a range from about 0.5 g to about 7 g.

10. A method for making a light absorber preform solution, comprising:
providing a plurality of carbon nanotubes;
placing the plurality of carbon nanotubes into a solvent and flocculating, to obtain a carbon nanotube suspension being a floccule structure, wherein the plurality of carbon nanotubes in the carbon nanotube suspension are entangled with each other to form a network structure; and
adding a plurality of carbon particles into the carbon nanotube suspension, wherein a mass ratio of the plurality of carbon nanotubes and the plurality of carbon particles is in a range from about 4:5 to about 4:70.

11. The light absorber preform solution of claim 1, wherein the light absorber preform solution is configured to be sprayed, so that a light absorber is formed, and an absorption rate of the light absorber in a wavelength range of 400 nm to 20 μm is 99.9%.

12. The light absorber preform solution of claim 1, further comprising a dispersant, wherein the light absorber preform solution consists of the dispersant, the solvent, the plurality of carbon nanotubes, and the plurality of carbon particles.

13. The light absorber preform solution of claim 12, wherein the dispersant is polyvinylpyrrolidone.

14. The method of claim 10, wherein the solvent is greater than or equal to about 50 mL.

15. The method of claim 14, wherein the solvent is about 200 mL, the carbon nanotube is about 0.4 g, the mass of the carbon particles is in a range from about 0.5 g to about 7 g.

16. The method of claim 10, wherein a method for making the plurality of carbon nanotubes comprises:
growing a carbon nanotube array on a growth substrate; and
scraping the carbon nanotube array from the growth substrate.

17. The method of claim 16, wherein a method for making the carbon nanotube array comprises:
(a) providing a substantially flat and smooth growth substrate;
(b) forming a catalyst layer on the growth substrate;
(c) annealing the growth substrate with the catalyst layer in air at a temperature in an approximate range from 700 degrees Celsius to 900 degrees Celsius for about 30 to about 90 minutes;
(d) heating the growth substrate with the catalyst layer to a temperature in an approximate range from 500 degrees Celsius to 740 degrees Celsius in a furnace with a protective gas therein; and
(e) supplying a carbon source gas to the furnace for about 5 to about 30 minutes and growing a super-aligned carbon nanotube array on the growth substrate.

18. The method of claim 17, wherein the super-aligned carbon nanotube array has a height more than 100 microns.

* * * * *